Nov. 12, 1968     J. A. RICHARD ET AL     3,410,323
FILLING VALVE FOR WET CELL BATTERY
Filed Nov. 26, 1965                     2 Sheets-Sheet 1

INVENTORS.
JAMES A. RICHARD
DONALD E. BELL
BY
Brown, Critchlow, Flick & Peckham
ATTORNEYS.

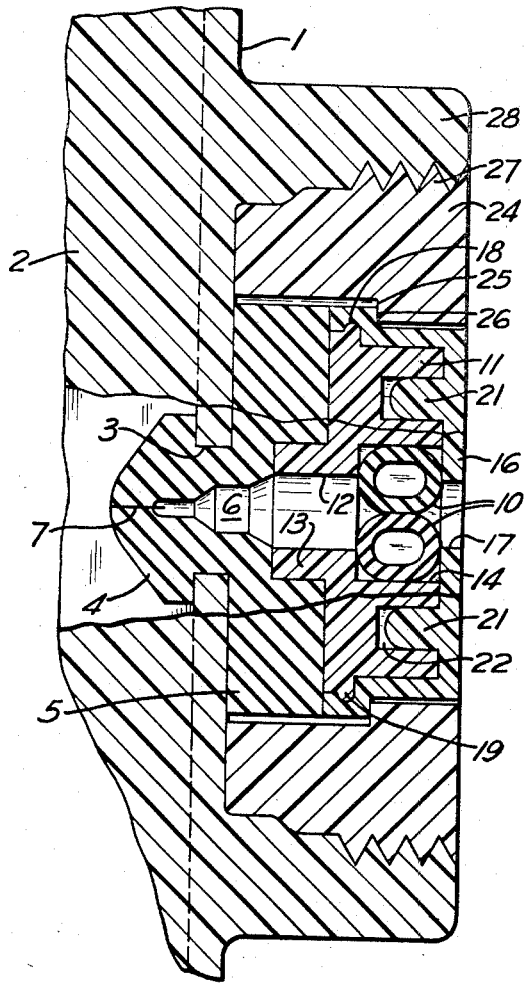
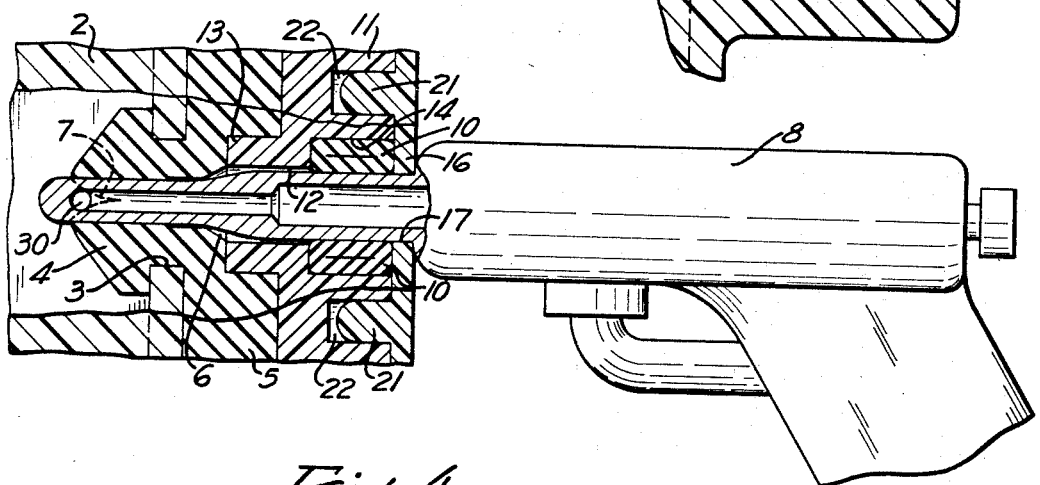

United States Patent Office 3,410,323
Patented Nov. 12, 1968

3,410,323
FILLING VALVE FOR WET CELL BATTERY
James A. Richard, Monroeville, and Donald E. Bell, Pittsburgh, Pa., assignors to Mine Safety Appliances Company, a corporation of Pennsylvania
Filed Nov. 26, 1965, Ser. No. 509,918
12 Claims. (Cl. 141—348)

ABSTRACT OF THE DISCLOSURE

A wet cell electrical battery case has a port in one wall which is closed by a resilient valve provided with an open outer passage connecting with a normally closed inner passage. The entrance to the passages normally is closed by a pair of parallel straight resilient sealing elements extending across the outer end of the valve. A nozzle can be pushed between these elements and through the passages to permit water to be supplied to the inside of the battery.

---

Wet cell batteries are provided with filling ports, through which water can be added from time to time. Generally, these ports are closed by removable plugs or caps to prevent leakage and entrance of foreign matter. In some cases, however, such as batteries used for lighting the lamps or miners' caps, the filling ports are never closed so that a rack of batteries not in use can be quickly filled by inserting the nozzle of a filling device into each open port in succession. These ports are usually on a side of the battery, but nevertheless they often become partly or completely filled with dirt and other foreign matter and they provide a through passage that allows such matter to enter the battery cells. Also, battery acid can leak out of the cells through the open ports.

It is among the objects of this invention to provide a wet cell battery with a filling port that normally is sealed, which is protected from entrance of foreign material and which allows delivery of water to the battery without any cap or plug having to be removed.

In accordance with this invention, the closed case of a wet cell battery has at least one port in one of its walls. This port is plugged by a resilient valve that has a portion projecting inwardly from the port. The valve is provided with an open outer passage extending from its outer end inwardly through the port and into the inwardly projecting portion of the valve. This projecting portion also is provided with a normally closed inner passage aligned with the outer passage for connecting the inner end of the outer passage with the inside of the case. A pair of parallel straight resilient sealing elements extend across the outer end of the valve and normally close the entrance to the passages. These elements engage each other along a line substantially perpendicular to the axis of the passages. The battery can be supplied with water by pushing a filling nozzle between the sealing elements and through the outer passage and then through the inner passages, which the nozzle will open.

The preferred embodiment of the invention is illustrated in the accompanying drawings, in which:

FIG. 3 is a vertical section taken on the line III—III of FIG. 1; and

FIG. 4 is a view similar to FIG. 3, but showing a filling nozzle inserted through one of the valves.

Figure 1:
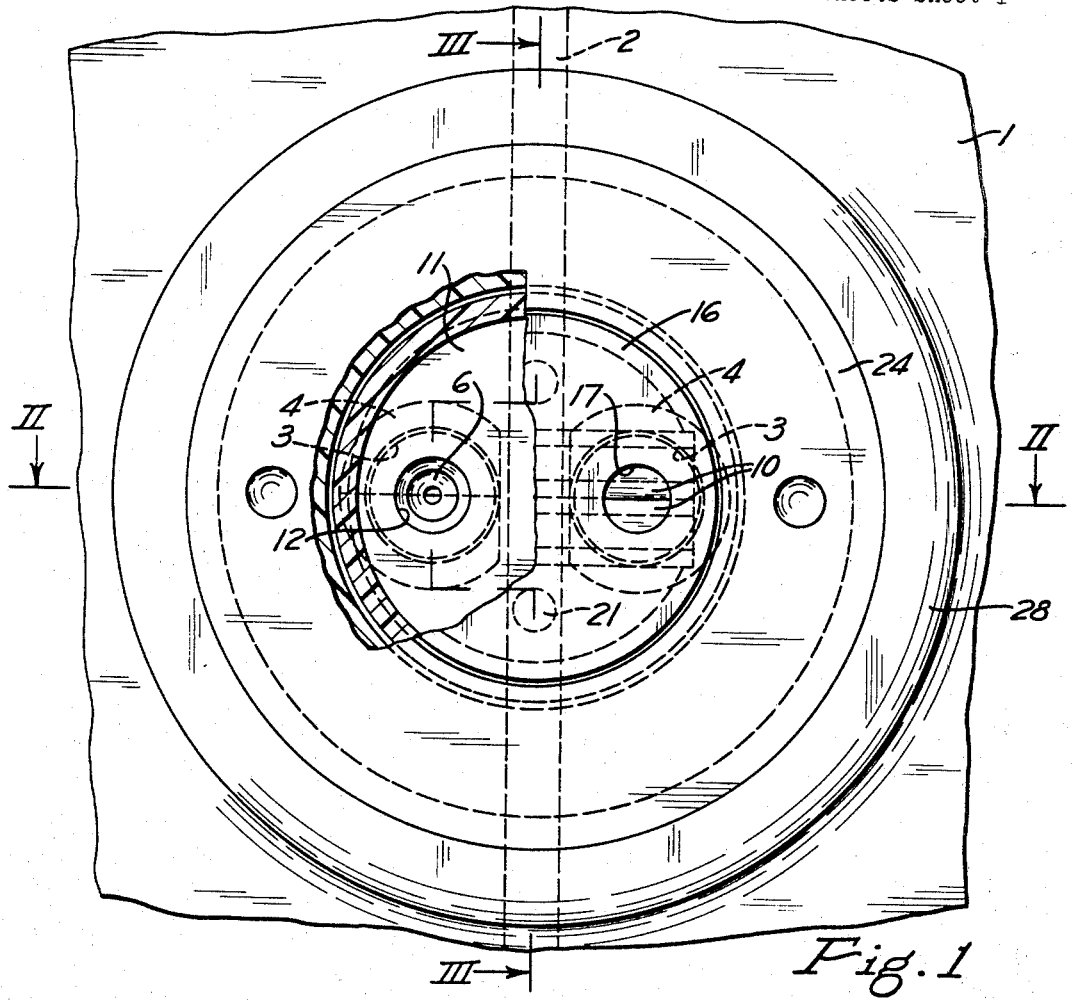
FIG. 1 is a fragmentary side elevation of a battery, partly broken away in section.
Figure 2:
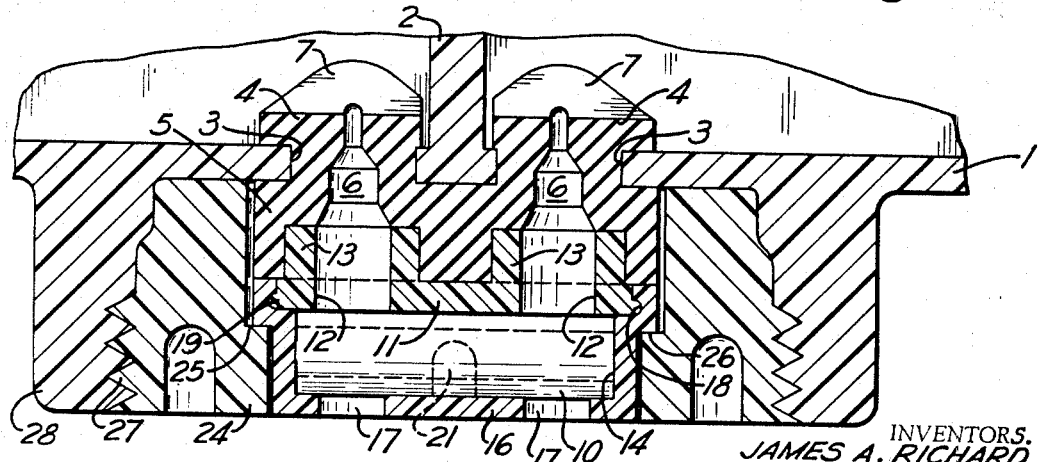
FIG. 2 is a fragmentary horizontal section taken on the line II—II of FIG. 1.

Referring to FIGS. 1, 2 and 3 of the drawings, a battery case is indicated which has an outside wall 1 and an inner partition 2 that divides the battery into two cells in a well-known manner. In order to be able to supply water to these cells, each of them is provided with a filling port 3. These ports are in the outer wall of the case close together on opposite sides of the partition. Each port contains a resilient plug or valve 4, most suitably made of molded rubber. The valves have inwardly projecting portions of larger diameter than the ports so that they overlie and engage the inner surface of the case wall around the ports. Preferably, these projecting portions are tapered inwardly. Each valve also projects outwardly from the case wall and overlies and engages the outer surface of that wall around the port. Preferably, the portions of the valves outside of the case are integrally connected, which is done most conveniently by forming their outwardly projecting portions as a single circular button 5.

Extending from the outer end of each valve inwardly through a case port 3 and into the inwardly projecting portion of the valve is an outer passage 6 shaped to receive the nozzle of a filling device. The innermost part of the inwardly projecting portion of each valve is provided with a normally closed inner passage that is aligned with its outer passage in order to connect the inner end of the latter with the inside of the case when the inner passage is opened. Most suitably, this inner passage is formed by providing the inner end portion of the valve with a transverse slit 7 extending entirely across it and connecting with the inner end of the outer passage. The valve is molded in such a way that the side walls of this slit normally will engage each other and seal the slit. This sealing is improved by having the valve fit the port in the case wall so tightly that the valve will be compressed radially. The closed slit prevents any leakage of the battery cell outwardly through the valve, and yet the slit can be opened by the nozzle of a filling device 8 by merely pushing the nozzle inwardly through the passages in the valve as shown in FIG. 4.

To prevent foreign matter from entering the outer ends of the valve passages, sealing elements are provided. These take the form of a pair of parallel, straight, resilient elements 10, preferably rubber tubes, that extend across the outer ends of both valves. The two tubes engage each other along a line that is substantially perpendicular to the axes of the valve passages. To hold the tubes in position and complete the sealing of the outer ends of the valve passages, a rigid retaining member 11 engages the outer surface of the valve button and is provided with a pair of laterally spaced openings 12 aligned with the valve passages. To assure proper alignment, each of these openings is provided with a flange 13 that fits in the enlarged outer end of the associated valve passage. The outer ends of the openings through the retaining member, which preferably is circular, are formed to receive the sealing tubes 10. For this purpose, the outer part of the retaining member is provided with a chamber 14 extending across it and across the openings through it. The two tubes fit snugly in this chamber and thereby seal the entrances to the valve passages.

To hold the tubes in place in chamber 14, a cap 16 covers the outer face of the retaining member, but is provided with a pair of laterally spaced holes 17 aligned with the valve passages. This cap preferably is circular and provided with a peripheral flange that encircles the retaining member. The two parts can be fastened together conveniently by providing the inside of he cap flange near its free edge with an annular groove 18 that receives an integral rib 19 encircling the retaining member. By making the cap of a suitable plastic, there will be enough give to it to permit its flange to be snapped over the rib. The two holes in the cap may be lined up with the valve passages by providing the cap with one or more positioning bosses 21 that project into recesses 22 in the retaining member on opposite sides of its tube chamber.

The cap and retaining member are held in place by a clamping ring 24 that has an internal shoulder 25 engaging an external shoulder 26 on the cap flange. The ring also is provided with external screw threads 27 that are screwed into an internally threaded annular collar 28 that projects from the side wall of the case. The pressure of the ring against the shoulder of the cap also serves to squeeze the valve button between the retaining member and the case and thereby improves the seal.

When the nozzle of the filling device is inserted in a hole 17 in the cap, it is then pushed between the tubes 10, which will be compressed by it to allow it to pass, and through the outer and inner valve passages in succession, the inner passage being opened by the nozzle spreading the oposite walls of slit 7 apart as shown in FIG. 4. Water can then be supplied through the nozzle to the inside of the cell. The tubes 10 not only normally seal the outer end of the valve passage from entrance of foreign matter, but when the filling nozzle is pushed inwardly between them, they also prevent it from carrying any foreign matter on it into the passage. The outlet orifices 30 in the nozzle are in the sides of its inner end, and the length of the nozzle in relation to the size of the valve assembly is such that when its inward movement is stopped by an enlarged portion of the filling device striking the face of cap 16, the orifices will be between the walls of the slit in the valve. By locating slit 7 in a horizontal plane and providing the filling device with a handle that normally will be held in a vertical position, the nozzle orifices will generally direct streams of water laterally across the walls of the slit and thereby will flush any dirt from them so that the slit will be sure to close tightly when the nozzle is withdrawn.

It will be seen that this battery has no caps that have to be removed from the filling ports before adding water, and then replaced. Yet, the filling passages normally are closed at both ends to prevent leakage of battery acid from the cells and to prevent dirt from entering the outer ends of the passages. Water can be added quickly to the cells by merely inserting the filling nozzle in each valve in succession.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A wet cell battery comprising a closed case having a port in one wall, a resilient valve plugging said port and having a portion projecting inwardly therefrom, the valve being provided with an open outer passage extending from its outer end inwardly through said port and into said projecting portion, said projecting portion being provided with a normally closed inner passage aligned with the outer passage for connecting the inner end of the outer passage with the inside of the case, and a pair of parallel straight resilient sealing elements extending across the outer end of the valve and normally closing the entrance to said passages, said elements engaging each other along a line substantially perpendicular to the axis of said passages, whereby a filling nozzle can be pushed between said sealing elements and through said outer and inner passages to permit water to be supplied to the inside of the case.

2. A wet cell battery according to claim 1, in which said sealing elements are tubes.

3. A wet cell battery according to claim 1, in which said valve engages the outer surface of said wall around said port, and including means pressing the valve against said wall, said means being provided with an opening therethrough aligned with said passages.

4. A wet cell battery according to claim 3, said means being provided with a flange around said opening projecting into the outer end of said outer passage.

5. A wet cell battery according to claim 3, said opening including a chamber containing said sealing elements.

6. A wet cell battery according to claim 1, in which said valve engages the outer surface of said wall around said port, and including a rigid retaining member engaging the outer end of the valve and provided with an opening aligned with said passages, the outer end of said opening being formed to receive said sealing elements, and means connected with said case pressing said retaining member against the valve.

7. A wet cell battery according to claim 6, in which said pressing means include a cap engaging the outer end of said retaining member and the side of said sealing elements and provided with a hole aligned with said passages, and means screwed onto the case holding said cap against said member.

8. A wet cell battery comprising a closed case having a pair of laterally spaced ports in one wall, a resilient valve plugging each port and having a portion projecting inwardly therefrom, each valve being provided with an open outer passage extending from its outer end inwardly through a port and into its projecting portion, said projecting portion also being provided with a normally closed inner passage aligned with its outer passage for connecting the inner end of the outer passage with the inside of the case, and a pair of parallel straight resilient elements extending across the outer ends of both valves and normally closing the entrances to said outer passages, said elements engaging each other along a line substantially in the common plane of the axes of said passages, whereby a filling nozzle can be pushed between said sealing elements and through said outer and inner passages of either valve to permit water to be supplied to the inside of the case.

9. A wet cell battery according to claim 8, including a rigid retaining member engaging the outer ends of both valves and having a pair of openings aligned with said valve passages, said member having a chamber extending across it at the outer ends of said openings containing said sealing elements, and a cap attached to the outer end of said member and provided with a hole in line with each of said openings.

10. A wet cell battery according to claim 9, in which said cap has a snap-on connection with said retaining member.

11. A wet cell battery according to claim 9, including an externally threaded ring urging said cap toward said case wall, the case being provided with an outwardly projecting annular collar encircling said ring and internally threaded for holding the ring.

12. The combination with a battery filling nozzle, of a wet cell battery comprising a closed case having a port in one wall, a resilient valve plugging said port and having a portion projecting inwardly therefrom, the valve being provided with an open outer passage extending from its outer end inwardly through said port and into said projecting portion, said projecting portion being slit transversely with the opposite sides of the slit normally tightly engaging each other to close the slit, the inner end of said outer passage opening into said slit between said sides for connecting the passage with the inside of the case when the slit is open, and a pair of parallel straight resilient sealing elements extending across the outer end of the valve and normally closing the entrance to said passages, said elements engaging each other along a line substantially perpendicular to the axis of said passages, whereby said nozzle can be pushed between said sealing elements and through said outer passage and between said sides to open said slit to permit water to be supplied to the inside of the case, the opposite sides of the end of the nozzle being provided with orifices, and means for limiting insertion of the nozzle to locate its orifices between the sides of the slit in order to direct water laterally across them to clean them.

References Cited

UNITED STATES PATENTS 3,065,763  11/1962  Howard _____ 137—223
3,174,501  3/1965  De See et al. _____ 137—223

HOUSTON S. BELL, Jr. *Primary Examiner.*